(12) United States Patent
Goto

(10) Patent No.: US 7,334,464 B2
(45) Date of Patent: Feb. 26, 2008

(54) AIRCRAFT FUEL TANK AND SENSOR SYSTEM

(75) Inventor: Kenichi Goto, Greensboro, NC (US)

(73) Assignee: Honda Motor Co., Ltd., Tokyo (JP)

( * ) Notice: Subject to any disclaimer, the term of this patent is extended or adjusted under 35 U.S.C. 154(b) by 94 days.

(21) Appl. No.: 11/226,805

(22) Filed: Sep. 14, 2005

(65) Prior Publication Data

US 2007/0234795 A1   Oct. 11, 2007

(51) Int. Cl.
*G01F 23/00* (2006.01)
(52) U.S. Cl. .......................................... 73/149; 73/323
(58) Field of Classification Search ................. 73/323, 73/149
See application file for complete search history.

(56) References Cited

U.S. PATENT DOCUMENTS

| 2,208,621 A | 7/1940 | Ball et al. |
| 2,314,555 A | 3/1943 | Preuss |
| 4,178,955 A | 12/1979 | Dau |
| 5,072,615 A | 12/1991 | Nawrocki |
| 5,357,801 A | 10/1994 | Sinclair |
| 5,495,745 A | 3/1996 | Hughes |
| 6,588,272 B2 * | 7/2003 | Mulrooney et al. ........... 73/324 |
| 6,715,349 B2 | 4/2004 | Atkinson |
| 2005/0178916 A1 * | 8/2005 | Howe .................... 244/135 R |

* cited by examiner

*Primary Examiner*—Hezron Williams
*Assistant Examiner*—Paul M West
(74) *Attorney, Agent, or Firm*—Rankin, Hill, Porter & Clark LLP; Mark E. Duell

(57) ABSTRACT

The aircraft tank and gauge system of the present invention provides a fuel tank with a gauge chamber located generally aligned with the tank center of gravity and that has a general vertical orientation when the aircraft is level. The gauge chamber extends from the top of the tank to a height generally equivalent to a high collection point on the tank and/or extends from the bottom of the tank to a height generally equivalent to a low collection point on the tank. As the aircraft pitches and rolls, fuel within a complex-shaped tank, will be measured by a sensor in the gauge chamber. In order to prevent any type of vapor blockage in the gauge chamber, a first vent extends from the bottom of the gauge chamber to the low collection point of the tank and a second vent extends from the top of the gauge chamber to the high collection point of the tank.

15 Claims, 4 Drawing Sheets

AIRCRAFT FUEL TANK AND SENSOR SYSTEM

BACKGROUND OF THE INVENTION

Useful space is at a premium within an aircraft. In order to maximize the amount of useful space, aircraft engineers have attempted to relocate certain storage areas, such as fuel storage areas, to areas that are not as versatile or useful for other purposes, such as cargo storage. An example of such an area is directly below the aircraft fuselage. One consequence of redeploying fuel tanks has been a need to redesign the shape of the tank to fit the new space. While tanks can be manufactured in virtually any shape, monitoring the amount of fuel remaining in a tank that does not have a simple geometric shape is not easy. Typically, an increase in the number of level sensors used per tank is required.

Referring to FIGS. 1A-1E, an ordinary rectangular tank is shown including a single centrally located gauge. FIG. 1A shows the tank and fuel relationship when the aircraft using the tank is flying level. FIG. 1B shows the tank and fuel relationship when the aircraft is rolling to the right and FIG. 1C shows the relationship when the aircraft is rolling to the left. FIG. 1D shows the tank and fuel relationship when the aircraft is pitching forward while FIG. 1E shows the relationship when the aircraft is pitching rearward. In all of the aforementioned instances, a single fuel sensor, centrally located, effectively measures the fuel level existing within the tank.

SUMMARY OF THE INVENTION

FIG. 2 illustrates tanks modified to fit beneath or in atypical places within an aircraft fuselage. FIG. 3 shows a typical modified tank. Here, because there is relatively more space to accumulate fuel at the ends of the tank, two sensors are used that fit within the end spaces to be able to measure fuel levels within the tank, particularly when the tank is close to being full. By increasing the number of fuel sensors required, purchase cost and ongoing use cost of the aircraft is increased. In addition to the obvious initial cost of purchasing more sensors, more time must be spent to calibrate a larger number of sensors and more back up sensors must be stocked in case of failures. What is desired is a way to utilize fewer fuel level sensors in fuel tanks that do not have simple shapes.

The present invention overcomes these and other disadvantages in prior art. The aircraft tank and gauge system of the present invention provides a fuel tank that includes one or two gauge chambers per fuel gauge used in the tank. If a single gauge is used, the gauge is generally vertically aligned with the center of gravity of the tank (determined when the tank is completely filled with fuel). However, any number of gauges may be used. The gauge chambers, as well, have a generally vertical orientation when the aircraft is level. The first gauge chamber extends from the top of the tank to a height generally equivalent to a high collection point for fuel in the tank while the second gauge chamber extends from the bottom of the tank to a height generally equivalent to a low collection point for fuel in the tank. As the aircraft pitches and rolls during flight, fuel within a complex-shaped tank, for almost all instances, will be present at the low collection point in the bottom of the tank. In order to provide fluid communication and to prevent any type of vapor blockage, if the tank includes a first gauge chamber protruding from the tank bottom, a vent is provided that extends from the bottom of the gauge chamber to the bottom of the tank at or near the low collection point. Thus, fuel at the low collection point will also be present at the bottom of the gauge chamber and is measurable by the gauge. If in addition to, or alternatively, when the tank has a gauge chamber protruding from the top of the tank, an additional vent extends from the top of the gauge chamber to top of the tank at or near the high collection point. Thus, when the tank is full, fuel is present at the top of the gauge chamber and can be measured. As a result, the level and volume of fuel in a complex-shaped tank can be determined using a minimum number of gauges.

These and other aspects of the invention are herein described in particularized detail with reference to the accompanying figures.

DETAILED DESCRIPTION OF THE INVENTION

Figure 4:
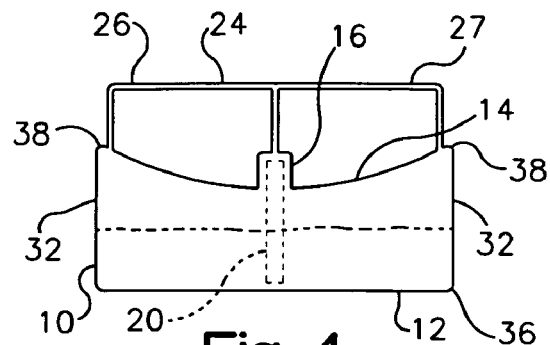
FIG. 4 is a schematic representation of a partially full complex-shaped fuel tank and sensor of the present invention.
Figure 5A:
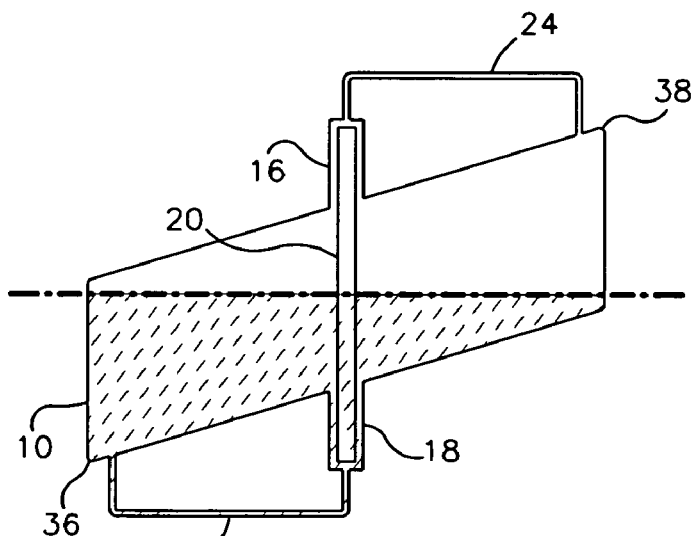
FIG. 5A is a schematic representation of an partially full trapezoidal shaped fuel tank and sensor of the present invention.
Figure 5B:
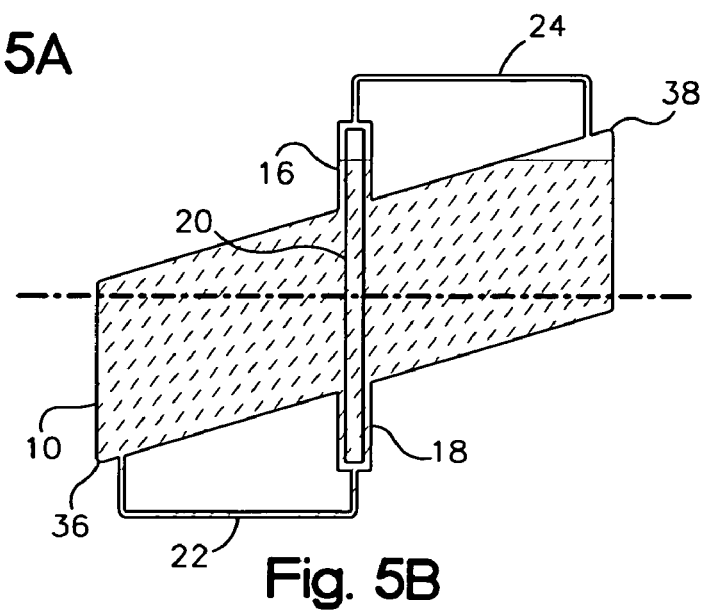
FIG. 5B is a schematic representation of the tank of FIG. 5a, but almost completely full.
Figure 5C:
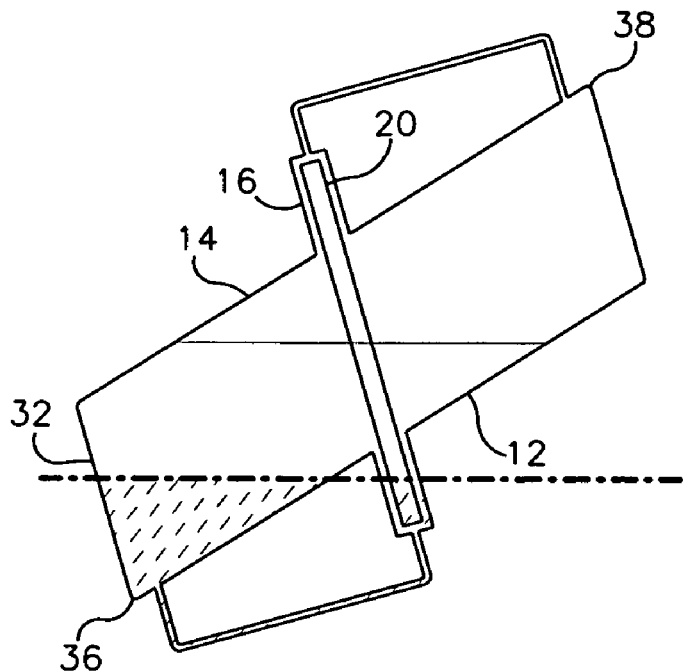
FIG. 5C is a schematic representation of the tank of FIG. 5a while the aircraft is rolling to the left.
Figure 5D:
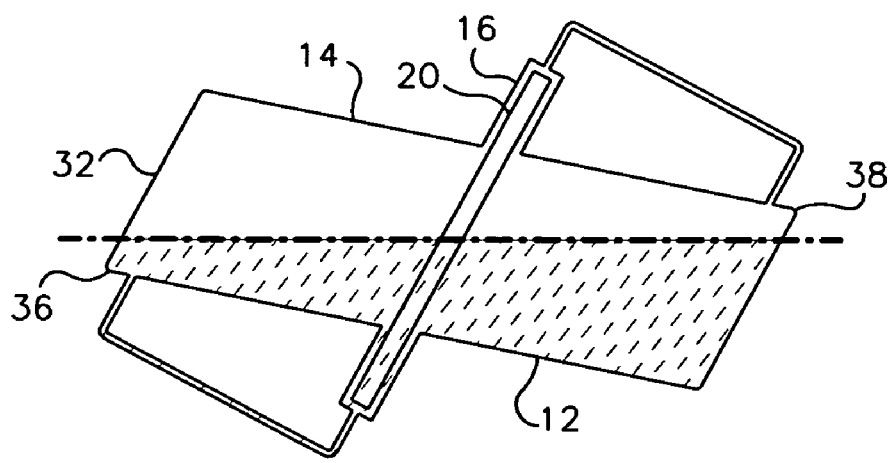
FIG. 5D is a schematic representation of the tank of FIG. 5a while the aircraft is rolling to the right.
Figure 6A:
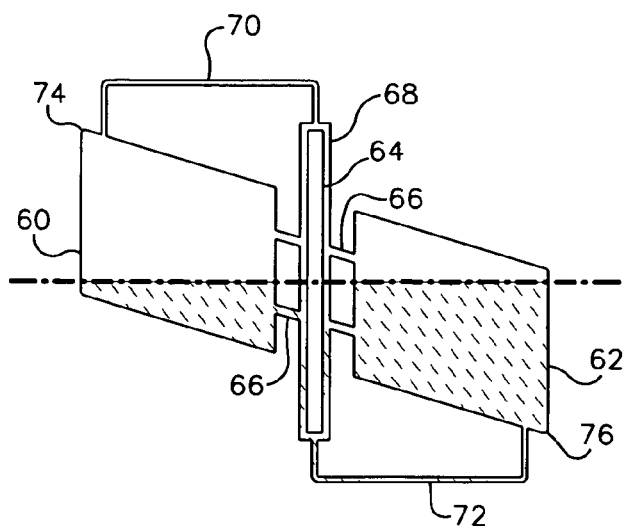
FIG. 6A is a schematic representation of a two part complex-shaped fuel tank and sensor of the present invention.

Referring to the drawings, specifically FIGS. 4-6, a preferred aircraft fuel tank and gauge system is illustrated. The tank is shown (in FIGS. 4, 5A and 6A) with the aircraft flying level and in an upright position. It will be well understood by those in the art that the tank in the present invention is subject to multiple changes in orientation, similar to the changes illustrated in FIGS. 1A-1E. The system includes a tank 10 with a complex shape, the tank 10 defines a bottom wall 12 and top wall 14, one or more sidewalls 32, and upper and lower gauge chambers 16 and 18 located generally vertically aligned with the center of gravity of the tank 10. In a preferred embodiment of the invention, the tank 10 houses a single fuel level gauge 20.

The tank 10 also includes first 22 and second 24 vents that allow fuel to occupy a lowermost and/or an uppermost portion of the gauge chambers 16 and 18 depending upon the orientation of the fuel tank 10.

Figure 1A:
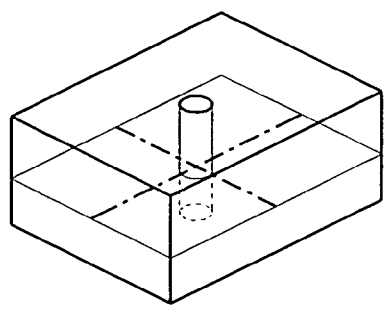
FIG. 1A is a schematic representation of a rectangular fuel tank in an aircraft flying with a level orientation.
Figure 1B:
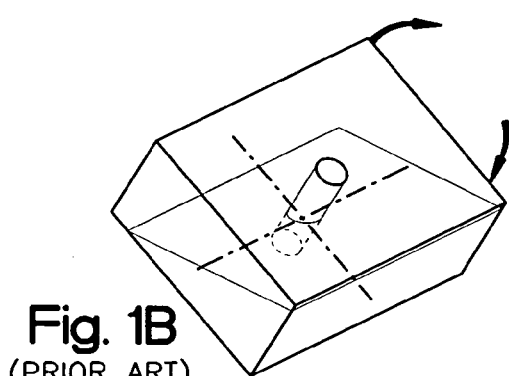
FIG. 1B is a schematic representation of a rectangular fuel tank in an aircraft rolling to the right.
Figure 1C:
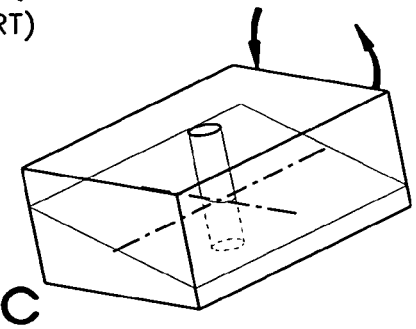
FIG. 1C is a schematic representation of a rectangular fuel tank in an aircraft rolling to the left.
Figure 1D:
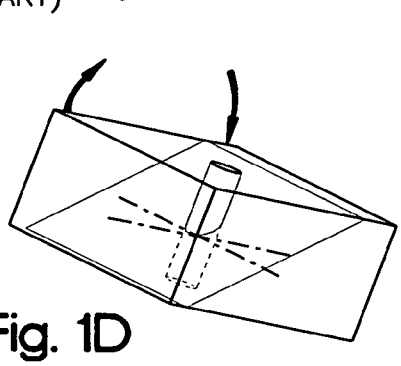
FIG. 1D is a schematic representation of a rectangular fuel tank in an aircraft pitching forward.
Figure 1E:
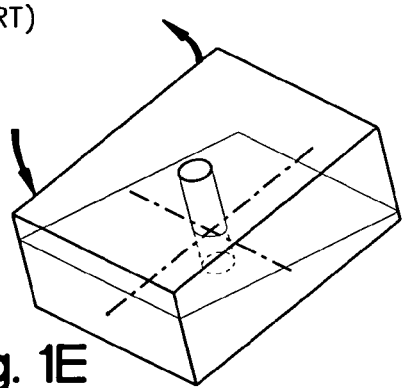
FIG. 1E is a schematic representation of a rectangular fuel tank in an aircraft pitching rearward.
Figure 2:
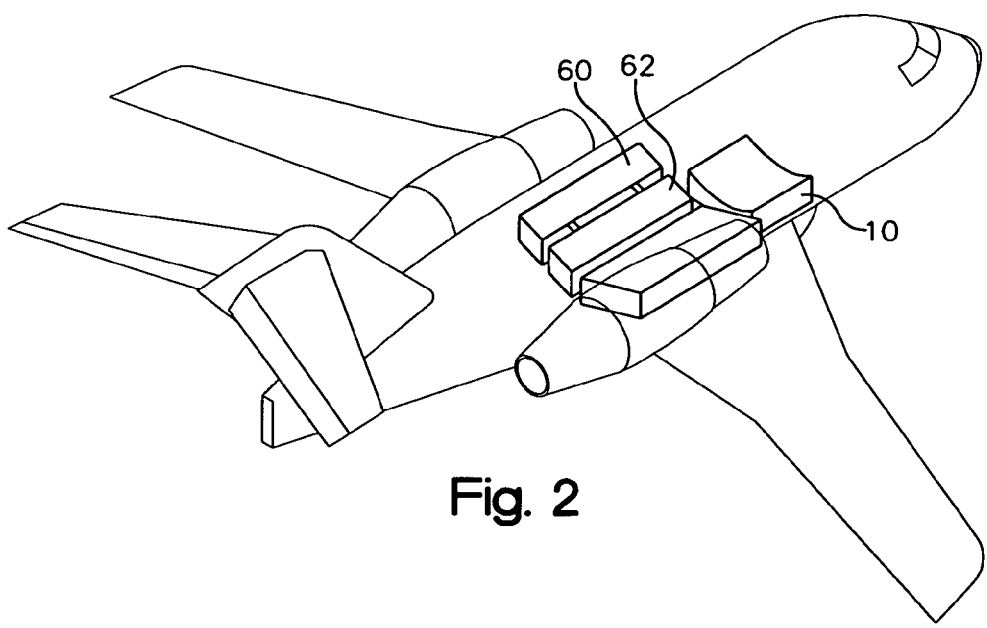
FIG. 2 is a schematic representation of an aircraft including several fuel tanks.
Figure 3:
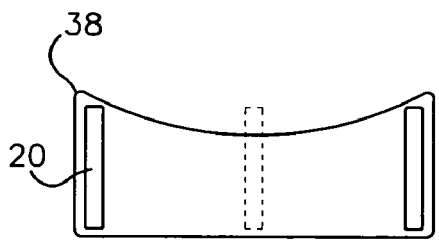
FIG. 3 is a schematic representation of a fuel tank with a complex shape.

Referring to FIGS. 3-5D, the fuel tank 10 bottom wall 12 is covered with fuel at least partially and often completely when the aircraft has a level, upright orientation. The bottom wall 12 is preferably planar, but may have any shape. As the aircraft changes its orientation, coverage of the bottom wall 12 of the tank 10 by the fuel changes (see FIGS. 5C and 5D). Fuel pools in a lowest corner of the tank 10, and in most cases the centrally located gauge 20 will still contact the fuel. The tank 10 also includes at least one side wall 32 extending generally upward from the tank bottom 12 and in the case of generally rectangular tanks, four side walls 32 are included. The tank top wall 14 is often at least partially covered with fuel. As shown in FIGS. 3 and 4, the top wall 14 of the tank 10 has a curved surface similar to the shape of the aircraft's fuselage underside. The top wall 14, bottom wall 12 and side walls 32 may have any shape depending upon the shape of the aircraft in the position where the tank 10 is to be placed.

Referring to FIG. 5A, the complex-shaped tank 10, in the illustrated embodiment a trapezoidal tank, defines one or more low collection points 36 for fuel in the bottom wall 12 of the tank 10. If the bottom wall 12 is flat bottomed, the low collection point 36 is, for example, the entire tank bottom wall as shown in FIG. 4. Referring to FIG. 5A, the low collection point 36 is located on the left-most portion of the tank bottom wall 12. When the aircraft is level and the tank 10 empty, the first part of the tank 10 to collect fuel will be the low collection point 36. A gauge 20 placed adjacent the low collection point 36 is the best tool for determining low fuel volume in the tank 10.

Similarly, the complex-shaped tank 10 defines one or more high collection points 38 in the top 14 of the tank 10. The tank 10 illustrated in FIG. 4 includes a curved top wall 14, symmetrical about its center, and defines two high collection points 38, one on the leftmost side of the top wall 14 and the other on the rightmost side of the top wall 14. When the aircraft is level and fuel is added to the tank 10, one of the last portions to collect fuel is the high collection point 38. Referring to FIG. 5A, the high collection point 38 is shown on the rightmost side of the top of the tank 10. Gauges 20 placed adjacent the high collection point(s) 38 are the best tool for determining high fuel volume (as shown in FIG. 3). It follows that a gauge 20 placed so as to access both the low collection point 36 and high collection point 38, or equivalent locations is the best tool for use in determining both low fuel volume and high fuel volume in a tank 10.

In order to allow the most preferred placement of the single gauge 20, the tank 10 defines (referring to FIG. 5A) the first gauge chamber 16 that is preferably located so as to be generally vertically aligned with the center of gravity of the tank 10. Even when the aircraft changes from one orientation to another there is a high probability that fuel will be present near the center of gravity of the fuel tank 10. Preferably, the gauge chamber 16 is oriented generally vertically with reference to the aircraft when the aircraft is level. The gauge chamber 16 receives part of the gauge 20, also preferably oriented generally vertically when the aircraft is level. The lowest point of the first gauge chamber 16 is at the top wall 14 of the tank while the highest point is at an elevation generally equivalent to the tank's high collection point 38 when the aircraft is level.

The second gauge chamber 18 is shown protruding from the bottom 12 of the tank 10. The second gauge chamber 18 extends from the tank bottom 12 to a height generally equivalent to the height of the low collection point 36 of the tank bottom 12 when the aircraft is level.

Referring back to FIG. 4, the first vent 24 is shown extending from the top of the gauge chamber 16 to the high collection point 38 of the top of the tank 14. Because the top of the tank 14 is symmetrical and curved, two high collection points 38 of equivalent height are defined. In this instance, the first vent 24 splits after protruding from the gauge chamber 16. A first arm 26 of the first vent 24 proceeds to the first high collection point 38 and a second arm 27 of the first vent 24 proceeds to the second high collection point 38.

Referring to FIG. 5A, both the first vent 24 and a second vent 22 are illustrated. The first vent 24 extends from the first gauge chamber 16 to the high collection point 38 of the top wall 14 of the tank 10. The second vent 22 extends from the second gauge chamber 18 to the low collection point 36 of the tank bottom wall 12. It is understood by those in the art that the vents 22 and 24 may have any number of arms depending upon the number of equivalent height high/low collection points in the tank. Similarly, although FIG. 4 shows two equivalent high collection points, any number of equivalent high collection points 38 are possible depending on the configuration of the tank 10.

Figure 6B:
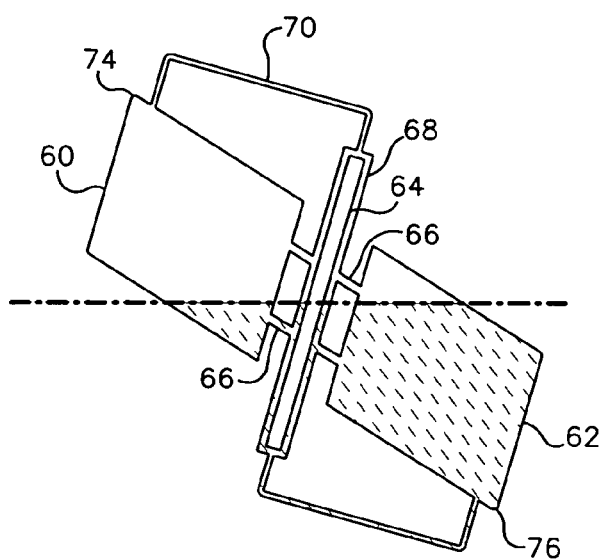
FIG. 6B is a schematic representation of the tank of FIG. 6a while the aircraft is rolling to the left.
Figure 6C:
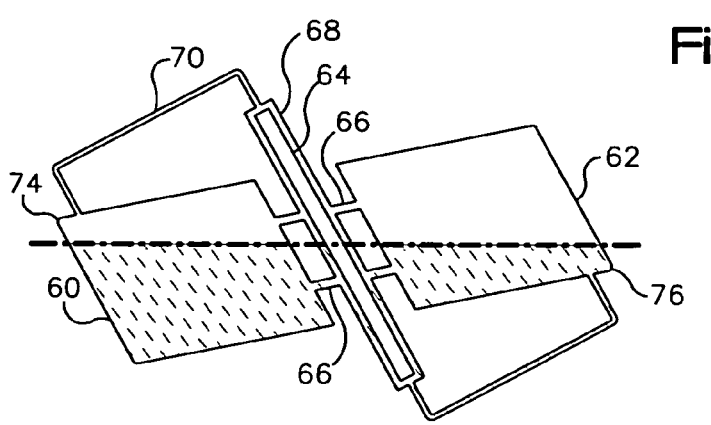
FIG. 6C is a schematic representation of the tank of FIG. 6a while the aircraft is rolling to the right.

Referring to FIGS. 6A-C, a system including two adjacent tanks 60 and 62 and a single gauge 64 is illustrated. The two adjacent tanks 60 and 62 may also be referred to as a single tank with two adjacent chambers. Two channels 66 allow fluid communication between the adjacent tanks 60 and 62. A single gauge chamber 68 is placed between the tanks and receives the gauge 64. A first vent 70 extends from the top of the gauge chamber 68 to at or near the high collection point 74 of the first tank 60. A second vent 72 extends from the bottom of the gauge chamber 68 to at or near the low collection point 76 of the second tank 62.

The present invention duplicates the versatility of a single gauge in a simple shaped tank although the tank of the present invention is complex. Referring to FIG. 4, fuel is shown filling approximately half of the volume of the fuel tank 10. In comparison with FIG. 3, the reduction in the number of level gauges required (2 to 1) is clearly shown. When the aircraft is level, the gauge 20 measures the fuel level in a manner similar to that of a simple shaped tank (see FIGS. 1A-E). As the aircraft rolls to the right or left, the fuel in the tank 10 moves into a corresponding side. The fuel level is again measured in a manner similar to that of a simple shaped tank, however the calculation of fuel volume is varied due to the different shape of the tank 10. Referring to FIG. 4, as the tank 10 is filled higher, fuel enters the gauge chamber 16 as it approaches the high collection points 38 of the tank 10. Fuel level measurement is still made using the single gauge 20. As the aircraft rolls to the left or right, fuel within the gauge chamber 16 easily flows to or from the gauge chamber 16 and the high collection points 38 of the tank 10. Thus, a single gauge 20 is still used to make fuel level measurements. The vents 26 and 27 prevent any air pockets from locking fuel in or out of the gauge chamber 16.

Referring to FIGS. 5A-C, when a small volume of fuel is stored in the tank 10, fuel moves from the low collection point 36 to the bottom of the second gauge chamber 18 through the second vent line 22. Absent the vent line 22, the fuel level in the tank 10 can not be measured with a centrally located gauge 20. Again, the central location of the gauge 20 allows for accurate measurements of fuel level, and thus, fuel volume to be made. As the aircraft pitches and rolls, measurements of fuel level are made using the centrally located gauge 20. As the tank 10 is filled with fuel, the first gauge chamber 16 fills with fuel at a level consistent with the level near the high collection point 38 in the tank. Any air that would prevent the fuel from entering the gauge chamber 16 is vented to the high collection point 38 in the tank 10 using the vent 24.

Referring to FIGS. 6A-C similar fuel movement occurs during the pitch and/or roll of the aircraft. The connecting channels allow fuel to flow between the two tanks 60 and 62 and into the gauge chamber 68.

Fuel volume calculations are made using measured fuel level data and measured data regarding orientation of the aircraft. The orientation of the aircraft can be obtained from comparing two or more measured fuel levels in combination with the geometry of the tank in which the measurements are made. This data is used, in one embodiment of the invention, to access a tank specific lookup chart, electronically stored, to determine actual fuel volume. When more than one tank and more than one gauge are installed on the aircraft, a signal processor can be employed in order to interface with all the fuel gauges, to calculate the remaining fuel quantity, to output the calculated data to such as cockpit displays and to send a discrete signal such as fuel low warning to the annunciator panels.

In some instances, the center of gravity of a complex tank is not the best place to locate a single measuring gauge because when the orientation of the tank is changed, fuel is not always in contact with the gauge. In these instances the preferred position is determined experimentally using a real or virtual liquid containing model of the tank. The proper placement of the gauge chamber(s) is then determined before the fuel tank is put into manufacturing production.

Although all of the illustrated embodiments show use of a single level gauge, more than one level gauge may be used for calculating fuel in a complex tank. For example, a tank with two gauge chambers may replace the same tank that requires four gauges without the presence of the gauge chambers.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. An aircraft fuel tank and gauge system comprising:
   a fuel tank having:
   a bottom defining a low collection point where, when the tank is empty, added fuel collects when the aircraft is level,
   a top defining a high collection point where, when the tank is full, added fuel collects when the aircraft is level, and
   a gauge chamber extending from the top of the tank to a height equal or above the high collection point of the tank;
   a gauge partially received within the gauge chamber and partially received within a main chamber of the tank; and
   a vent providing fluid communication between the top of the tank and a top of the gauge chamber.

2. The aircraft fuel tank and gauge system of claim 1, wherein a second gauge chamber extends from the tank bottom to a height generally equivalent with the low collection point and when the gauge is also partially received within the second gauge chamber.

3. The aircraft fuel tank and gauge system of claim 2, further including a second vent providing fluid communication between the tank bottom and the bottom of the second gauge chamber.

4. The aircraft fuel tank of claim 3, wherein the second vent provides fluid communication between the bottom of the tank at or near the low collection point and the bottom of the gauge chamber.

5. The aircraft fuel tank and gauge system of claim 4, further including a second vent providing fluid communication between the high collection point of the tank top and the top of the gauge chamber.

6. The aircraft fuel tank and gauge system of claim 1, wherein the tank has a generally flat bottom and a curved top.

7. The aircraft fuel tank and gauge system of claim 1, wherein the tank has a generally trapezoidal body shape.

8. The aircraft fuel tank of claim 1, wherein the vent provides fluid communication between the top of the tank at or near the high collection point and the top of the gauge chamber.

9. An aircraft fuel tank and gauge system comprising:
   a fuel tank having:
   a bottom defining a low collection point where, when the tank is empty, added fuel collects when the aircraft is level,
   a top defining a high collection point where, when the tank is full, added fuel collects when the aircraft is level, and
   a gauge chamber extending from the top of the tank to a height equal or above the high collection point of the tank;
   a gauge received within the gauge chamber; and
   a vent providing fluid communication between the top of the tank and a top of the gauge chamber;
   wherein the tank has a generally flat bottom and a curved top; and
   wherein the tank has first and second high collection points at generally equivalent elevations and the first vent provides fluid communication between the gauge chamber and the first high collection point and further including an additional vent that provides fluid communication between the gauge chamber and the second high collection point.

10. An aircraft fuel tank and gauge system comprising:
    a fuel tank having:
    at least two tank chambers, each chamber fluidly connected to an adjacent chamber using at least two channels;
    a bottom defining a low collection point where, when the tank is empty, added fuel collects when the aircraft is level,
    a top defining a high collection point where, when the tank is full, added fuel collects when the aircraft is level, and
    a gauge chamber configured between the two tank chambers and directly in fluid communication with the two tank chambers via at least one of the channels, the gauge chamber extending from an elevation generally equivalent with the high collection point of the top of the tank to an elevation generally equivalent with the low collection point of the bottom of the tank;
    a gauge disposed within the gauge chamber; and
    a vent providing fluid communication between the bottom of the tank and a bottom of the gauge chamber.

11. The aircraft fuel tank and gauge system of claim 10, further including a second vent providing fluid communication between the top of the tank and the top of the gauge chamber.

12. The aircraft fuel tank of claim 11, wherein the second vent provides fluid communication between the top of the tank at or near the high collection point and the top of the gauge chamber.

13. The aircraft fuel tank of claim 10, wherein the vent provides fluid communication between the bottom of the tank at or near the low collection point and the bottom of the gauge chamber.

14. An aircraft fuel tank and gauge system comprising:
 a fuel tank having:
  a bottom defining a low collection point where, when the tank is empty, added fuel collects when the aircraft is level,
  a top defining a high collection point where, when the tank is full, added fuel collects when the aircraft is level, and
  a gauge chamber extending from the top of the tank to a height equal or above the high collection point of the tank;
 a gauge received within the gauge chamber; and
 a vent providing fluid communication between the top of the tank and a top of the gauge chamber;
wherein the diameter of the gauge chamber is consistent along the length of the gauge chamber.

15. An aircraft fuel tank and gauge system comprising:
 a fuel tank having:
  a bottom defining a low collection point where, when the tank is empty, added fuel collects when the aircraft is level,
  a top defining a high collection point where, when the tank is full, added fuel collects when the aircraft is level, and
  a gauge chamber extending from the top of the tank to a height equal or above the high collection point of the tank;
 a gauge received within the gauge chamber; and
 a vent providing fluid communication between the top of the tank and a top of the gauge chamber;
wherein the gauge chamber is located approximately at the center of gravity of the tank.

* * * * *